(12) United States Patent
Trajkovic et al.

(10) Patent No.: US 12,160,662 B2
(45) Date of Patent: Dec. 3, 2024

(54) AUTOMATIC FOCUS SETUP FOR FIXED MACHINE VISION SYSTEMS

(71) Applicant: ZEBRA TECHNOLOGIES CORPORATION, Lincolnshire, IL (US)

(72) Inventors: Miroslav Trajkovic, Setauket, NY (US); Heng Zhang, East Setauket, NY (US); Igor Vinogradov, Oakdale, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 17/554,704

(22) Filed: Dec. 17, 2021

(65) Prior Publication Data
US 2023/0199310 A1 Jun. 22, 2023

(51) Int. Cl.
*H04N 23/67* (2023.01)
*G02B 3/14* (2006.01)

(52) U.S. Cl.
CPC ............... *H04N 23/67* (2023.01); *G02B 3/14* (2013.01)

(58) Field of Classification Search
CPC ...... H04N 23/67; H04N 23/61; H04N 23/676; H04N 23/673; G02B 3/14
See application file for complete search history.

(56) References Cited

U.S. PATENT DOCUMENTS

| | | | |
|---|---|---|---|
| 8,864,035 B2* | 10/2014 | Fukuba | G02B 26/005 |
| | | | 235/462.01 |
| 11,438,518 B1 | 9/2022 | Barish et al. | |
| 2010/0149363 A1 | 6/2010 | Inomata et al. | |
| 2014/0097251 A1* | 4/2014 | Joussen | G06K 7/1491 |
| | | | 235/462.07 |
| 2016/0142625 A1 | 5/2016 | Weksler et al. | |
| 2017/0357035 A1* | 12/2017 | Nunnink | G02B 7/028 |
| 2017/0358094 A1 | 12/2017 | Sun et al. | |
| 2019/0107720 A1 | 4/2019 | Palacios et al. | |
| 2020/0034591 A1* | 1/2020 | Bachelder | G06K 7/10811 |
| 2021/0243422 A1 | 8/2021 | Hayasaka et al. | |
| 2022/0100979 A1* | 3/2022 | Fernandez-Dorado | |
| | | | G01S 17/46 |

OTHER PUBLICATIONS

International Search Report and Written Opinion for International Application No. PCT/US2022/45023 mailed on Jan. 3, 2023.

* cited by examiner

*Primary Examiner* — Shahbaz Nazrul
(74) *Attorney, Agent, or Firm* — Yuri Astvatsaturov

(57) ABSTRACT

A system and methods for performing focus tuning of an imaging system. The method includes an image sensor obtaining a plurality of images, with each image obtained at a different focus of a tunable optical element. A processor identifying a reference element in at least one of the images of the plurality of images. The processor then determines a reference image that includes the reference element and identifies a reference focus of the tunable optical element. The processor then stores the identified reference focus in a memory.

20 Claims, 5 Drawing Sheets

AUTOMATIC FOCUS SETUP FOR FIXED MACHINE VISION SYSTEMS

BACKGROUND

Typical barcode readers, such as handheld barcode readers, point of sale scanners, and direct part marking scanners, require high quality, low-blur images to decode barcodes found in the images. Therefore, the focus calibration of scanners and machine vision systems is integral for proper, and efficient, operation. Typically, focus tuning or alignment is performed manually using either a graphical user interface (GUI) or by hand using optical tuning tools to adjust optical mounts. The focus tuning process can be very slow and cumbersome as it requires a user to look at captured images and determine, in real time, an ideal focus from the captured images. The user must both be observing images and physically adjusting the focus at the same time which is often inconvenient for many barcode reader systems. Further, manual focus tuning is error prone as it relies on the subjective nature of a person to determine when they believe an image is the sharpest.

As such, it could be beneficial for a barcode reader to implement a method for performing focus tuning that does not require manual tuning and subjective evaluation of a person or operator.

SUMMARY

In an embodiment, the present invention in a focus tuning imaging system. The system comprises a tunable optical element, and a controller in communication with the tunable optical element, with the controller configured to control a focus of the tunable optical element. A reference element is placed at a reference plane a distance from the imaging system. The system further includes a processor and computer-readable media storing (i) one or more predefined diopter values of the tunable optical element and (ii) machine readable instructions stored thereon. Then the machine readable instructions are executed they cause the imaging system to (i) obtain, by an imaging sensor of the imaging system, a plurality of images, each image of the plurality of images obtained at a different focus of the tunable optical element, (ii) identify, by the processor, the reference element in at least one of the images of the plurality of images, (iii) determine, by the processor, a reference image of the plurality of images from the at least one of the images including the reference element, (iv) identify, by the processor, a reference focus of the tunable optical element, the reference focus corresponding to the determined reference image, and (v) store, in the memory, the identified reference focus.

In a variation of the current embodiment, the reference element may include at least one of a 1D barcode, 2D barcode, static QR code, dynamic QR code, UPC code, a predefined custom pattern, alphanumeric identifier, a feature having a spatial frequency content of greater than a 2 mil barcode or 2 pixels per module, electrical traces on a circuit board, one or more electrical components, grids on a surface, a pattern on a surface, predefined fiducial marks, an outline of an object of interest, or an element with a plurality of different sized features at different focuses of the imaging system.

In another variation of the current embodiment, the reference element is selectively removable from the imaging system.

In yet another variation of the current embodiment, to determine the reference image, the machine readable instructions further cause the imaging system to determine, by the processor, an image quality value for each image identified as having the reference element, and determine, by the processor, the reference image based on the determined image quality values.

In another variation of the current embodiment, the tunable optical element comprises an electrically tunable lens.

In another embodiment, the present invention is a method for performing focus tuning of an imaging system. The method includes obtaining, by an imaging sensor, a plurality of images, each image of the plurality of images obtained at a different focus of a tunable optical element; identifying, by a processor, a reference element in at least one of the images of the plurality of images; determining, by the processor, a reference image of the plurality of images from the at least one of the images including the reference element; identifying, by the processor, a reference focus of the tunable optical element, the reference focus corresponding to the determined reference image; and storing, in a memory, the identified reference focus.

In a variation of the current embodiment, the reference element may include at least one of a 1D barcode, 2D barcode, static QR code, dynamic QR code, UPC code, a predefined custom pattern, alphanumeric identifier, a feature having a spatial frequency content of greater than a 2 mil barcode or 2 pixels per module (ppm), text, electrical traces on a circuit board, one or more electrical components, grids on a surface, a pattern on a surface, predefined fiducial marks, an outline of an object of interest, or an element with a plurality of different sized features at different focuses of the imaging system.

In another variation of the current embodiment, the reference element is selectively removable from the imaging system.

In yet another variation of the current embodiment, to determine the reference image, the machine readable instructions further cause the imaging system to determine, by the processor, an image quality value for each image identified as having the reference element, and determine, by the processor, the reference image based on the determined image quality values.

In another variation of the current embodiment, the tunable optical element comprises an electrically tunable lens.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
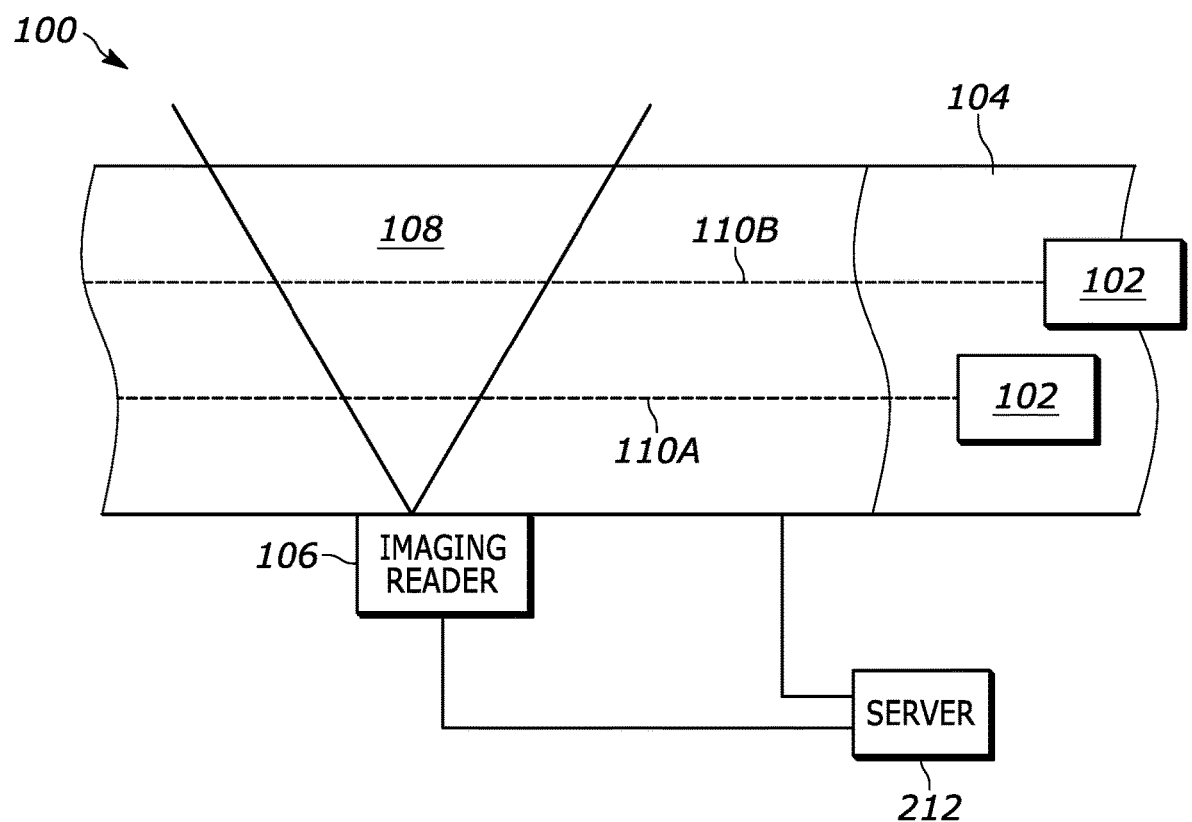
FIG. 1 illustrates a variable focus scanning station, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Electrically controlled variable focus (VF) lenses are convenient, low-power solutions for fast auto-focus (AF) on objects of interests (OOI) in machine vision and bar-code applications. However, when location of objects of interest in the field of view varies (e.g., parts moving on conveyor, a person moving an object across a scanner field of view, etc.) or focus drift occurs, an AF imaging system may be unable to determine the OOI. In many scanning applications, it is desirable to one or more keep focus planes constant. VF lenses do not provide any feedback signal indicating a current optical power or focus which can change after initial settings due to ambient temperature variation, aging, and other factors. Further, manual focus control is typically how imaging systems are setup and calibrated. Manual setup can lead to errors due to subjective image analysis of a person performing the calibration, and is also limited to a single plan of inspection at a time. Manual setup is also time consuming and requires training and expertise that may not be readily available. The disclosed system and methods overcome many of the described obstacles by enabling automatic tuning of focus of an imaging system utilizing a VF optical element.

The disclosed system and methods enable the focus tuning of variable focus and autofocus systems for performing scanning in machine vision and barcode applications. The method obtains a plurality of images, identifies reference features in one or more of the obtained images, and determines one or more reference focuses from the images having the identified reference features. The disclosed system and methods may be performed during setup of a system for an initial calibration, or for a system during operation to retune a focus of a system or to change the reference focuses depending on a change of a target, or change of distances of targets from the imaging system.

Referring now to the drawings, FIG. 1 illustrates an exemplary environment where embodiments of the present invention may be implemented, including the processes described and illustrated herein. In the present example, the environment is provided in the form of a scanning station 100 where goods 102 are moved across or along a scanning surface 104 and are scanned by an imaging reader 106 to identify the goods 102. In some embodiments, the scanning station is a point-of-sale (POS) station, which may have a computer system and an interface, not shown, for optically scanning goods and identifying the goods and characteristics of the goods for affecting a transaction. In some embodiments, the scanning station 100 is part of an inventory delivery system, where goods are conveyed by the scanning surface or across the scanning surface to monitor and control delivery of the goods, for example, shipping goods from a facility or receiving shipped goods to a facility. While the describe system and method may be implemented in a point-of-sale (POS) station, the described technologies would also be beneficial for machine vision applications that scan objects on a conveyer belt at a factory or distribution center, for example.

The scanning surface 104 may be a stationary surface, such that the goods 102 are manually moved relative to the surface 104. In embodiments, the scanning surface 104 may move the goods 102 or be moved by another automated means. In other embodiments, the scanning surface 104 may be a moving surface, such as by a conveyor system such as a conveyer belt, pneumatic conveyer, wheel conveyer, roller conveyer, chain conveyer, flat conveyer, vertical conveyer, trolley conveyer, or another conveyer. In any case, the goods 102 may be moved continuously relative to the imaging reader 106, such that the goods 102 are constantly moving through a working (or scanning) range 108 of the station 100. In some examples, the goods 102 move in a discretized manner, where, at least part of the time the goods 102 are maintained fixed on the surface 104 relative to the imaging reader 106 for a period of time, sufficient to allow one or more images to be captured of the goods 102.

The goods 102 may move along different substantially linear paths 110A, 110B, etc. each path traversing the working range 108 but at a different distance from the imaging reader 106. Indeed, the paths 110A, 110B are for illustration purposes, as the goods 102 may traverse across the surface 104 along a single path, or along a plurality of paths at any distance from the imaging reader 106. Optics of the imaging reader 106 must be aligned and properly tuned for the imaging reader 106 to image the goods 102 at distances according to the linear paths 110A and 110B. Typically, imaging readers are manually tuned or aligned which requires a person to either utilize a GUI to control tunable elements, or to manually tune lenses and optics physically by hand using a screwdriver or other tool. The manual tuning of the imaging system 106 is prone to subjective error as optimal focus of the imaging reader 106 is subjectively determined by a person observing obtained images at different focuses. Further, manual tuning the imaging reader 106 is time consuming for a single focus of the imaging reader 106, which compounds for systems requiring a plurality of reference focuses as in the example of FIG. 1 having goods along two paths 110A and 110B.

In some exemplary embodiments, the imaging reader 106 includes a variable focus (VF) imaging system, or an autofocus system in which the reader 106 controls the VF imaging system to set the focus of the imaging system to predetermined reference focuses for scanning an object of interest (OOI) (such as the goods 102. The imaging reader 106 may then change its focus until the object, or a region of interest of the OOI (e.g., a barcode, serial number, other identifiers, etc.) is located and then brought sufficiently into focus, by a predetermined amount (e.g., that may be stored in the memory of the imaging reader 106 or server 112), on the imaging sensor. With at least some embodiments of the present invention, the imaging reader scans for the object (e.g., goods 102) only at discretized, determined distances, i.e., reference focus distances, corresponding to imaging planes of the imaging reader 106. Instead of continuous scanning, the imaging reader 106 more quickly captures images at one or more predetermined imagining planes. The imaging planes are defined relative to the imaging reader 106. For illustration purposes, in FIG. 1 imaging planes happen to coincide with paths (e.g., 110A, 110B, etc.) over which the goods 102 traverse. Although, it is more likely the case that the imaging planes will not exactly coincide with the scan path of goods. Additionally, there may be multiple imaging planes for a single good. For example, an OOI may include two or three different indicia at different surfaces or distances from the imaging reader, therefore, multiple reference focuses or imaging planes may exist for each path 110A or 110B.

While, in FIG. 1, the imaging reader 106 is depicted as being to the side of the goods 102, in embodiments, the imaging reader 106 may be positioned directly above the goods 102, above the goods 102 in front of or behind the goods 102 configured to image the OOI, or at another positon for imaging a region of interest of the goods 102 or any OOI. The imaging reader 106 captures images at each of the imaging planes, where the captured images of the good will vary in focus depending on where the good (and its scan path) is relative to the imaging reader 106. That is, the good will appear more in focus at some imaging planes in comparison to others. By capturing images of the goods at only certain imaging planes, i.e., reference planes, the imaging reader 106 is able to identify the goods 102 much faster than a conventional autofocus system. Indeed, the imaging reader 106 can be configured such that if it has an autofocus operation that operation is disabled, and instead images are captured at specific imaging planes irrespective of which scan path the good traverses and without needing to continuously detect the good and autofocus onto the good. This operation greatly reduces power consumption demands on the imaging reader 106.

The imaging reader 106 requires initial setup before operation, and further, as previously described, electrically tunable AF lenses and systems may undergo focus plane drift due to environmental and other factors, which causes the defocusing of images of OOI reducing the efficacy of the VF imaging reader 106. As discussed further herein, the identification and scanning efficiencies can be increased only performing tuning of the imaging reader 106 using an AF lens or system to determine one or more reference focuses of the imaging reader 106. The described methods may be performed an initial setup of the imaging reader 106, or at any time when tuning or refocusing of the imaging reader may be required for performing machine vision and scanning applications. The disclosed systems and methods increase efficiency, and therefore reduced time required, for reading identifiers on an OOI, e.g., to identify an indicia or other barcode on the good. The methods use image quality metrics to determine reference focuses and at least some of the image quality metrics and parameters, scanning parameters, and/or calibration parameters described further herein, may be stored on a server 112 communicatively coupled to the imaging reader 106, and the imaging reader may retrieve the image quality metrics and parameters, scanning parameters, and/or calibration parameters, from the server or another memory or form of storage.

Figure 2:
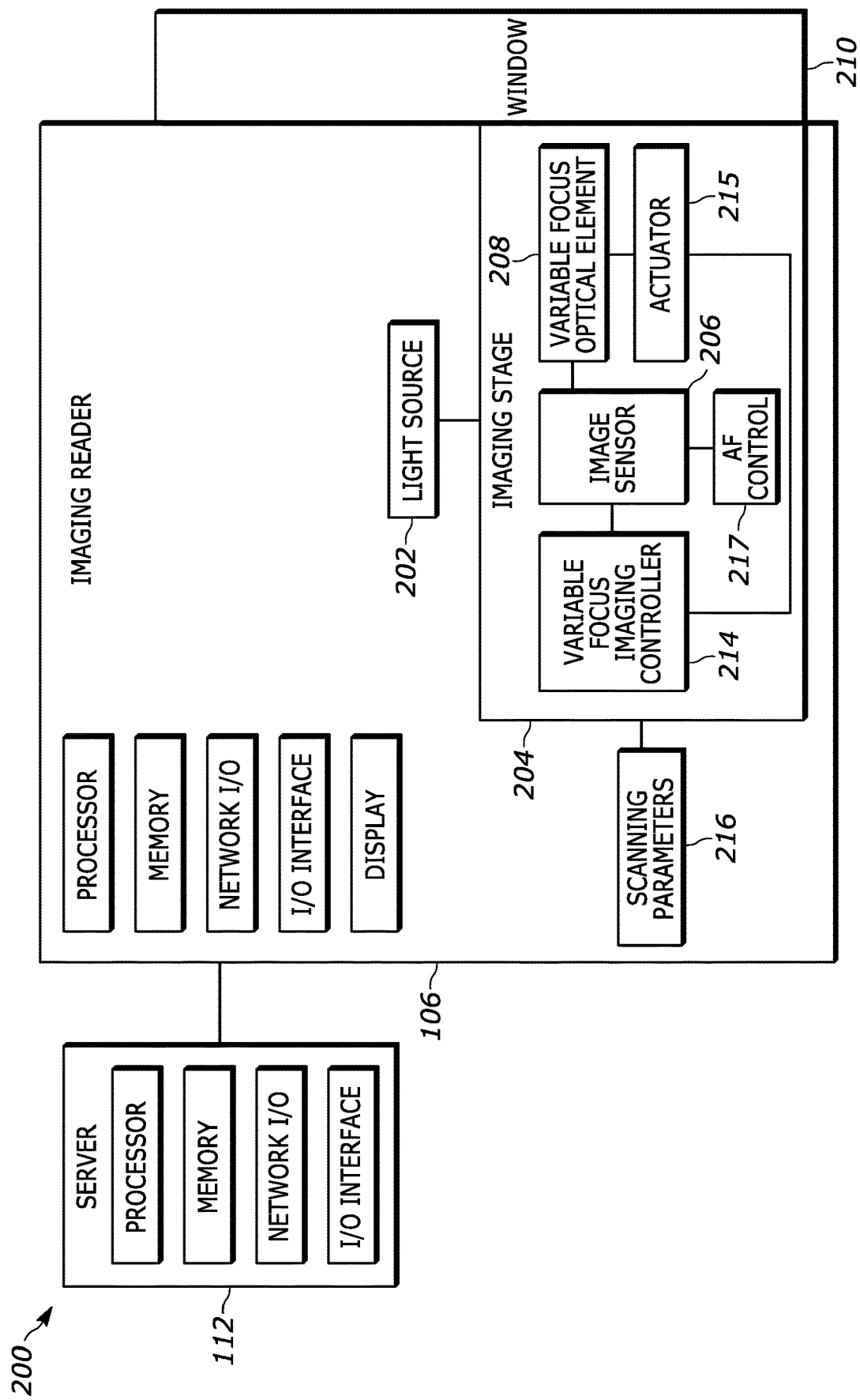
FIG. 2 is an exemplary block diagram schematic of an imaging reader of the variable focus scanning station of FIG. 1, in accordance with an embodiment of the present invention.

FIG. 2 illustrates a block connection diagram of system 200 including an imaging reader 106. In FIG. 2 the imaging reader 106 may have one or more processors and one or more memories storing computer executable instructions to perform operations associated with the systems and methods as described herein. The imaging reader 106 includes a network input/output (I/O) interface for connecting the reader to the server 112, an inventory management system (not shown), and other imaging readers. These devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards. The imaging reader 106 further includes a display for providing information such as visual indicators, instructions, data, and images to a user.

In some embodiments, the server 112 (and/or other connected devices) may be located in the same scanning station 100. In other embodiments, server 112 (and/or other connected devices) may be located at a remote location, such as on a cloud-platform or other remote location. In still other embodiments, server 112 (and/or other connected devices) may be formed of a combination of local and cloud-based computers.

Server 112 is configured to execute computer instructions to perform operations associated with the systems and methods as described herein. The server 112 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used.

In the illustrated example, the imaging reader 106 includes a light source 202, which may be a visible light source (e.g., a LED emitting at 640 nm) or an infrared light source (e.g., emitting at or about 700 nm, 850 nm, or 940 nm, for example), capable of generating an illumination beam that illuminates the working range 108 for imaging over an entire working distance of that working range 108. That is, the light source 202 is configured to illuminate over at least the entire working range 108. The illumination intensity of the light source 202 and the sensitivity of an imaging reader can determine the further and closest distances (defining the distance of the working range, also termed the scanning range) over which a good can be scanned, and a barcode on the good can be decoded. The light source 202 is controlled by processor and may be a continuous light source, an intermittent light source, or a signal-controlled light source, such as a light source trigged by an object detection system coupled (or formed as part of though not shown) to the imaging reader 106. The light source may be an omnidirectional light source.

The imaging reader 106 further includes an imaging arrangement 204 having an imaging sensor 206 positioned to capture images of an illuminated target, such as the goods 102 or another OOI, within the working range 108. In some embodiments, the imaging sensor 206 is formed of one or more CMOS imaging arrays. A variable focusing optical element 208 is positioned between the imaging sensor 206 and a window 210 of the imaging reader 106. A variable focus imaging controller 214 is coupled to the variable focusing optical element 208 and controls the element 208 to define one or more discrete imaging planes for the imaging sensor. The one or more discrete imaging planes may be considered one or more reference focal planes as described here. As previously described, a reference focal plane is the imaging plane that is expected to result in the highest efficiency of decoding of indicia in the image, which may depend on an edge sharpness value or another property of an image.

In the illustrated example, the controller 214 is coupled to the variable focusing optical element 208 through an actuator control unit 215 and bypasses an optional autofocus control unit 217, thereby providing faster image capture at the desired imaging planes by overriding the slower autofocus control units of conventional systems. The actuator 215 may include a focusing lens drive, a shift lens drive, a zoom lens drive, an aperture drive, angular velocity drive, voice coil motor drive, and/or other drive units for controlling operation of the optical element 208, which itself may comprise multiple lens, lens stages, etc.

The VF optical element 208 may be a deformable lens element, a liquid lens, a T-lens or another VF optical element. In some embodiments, the optical element includes a voice coil actuator motor in the actuator 215 that is controllably adjusted by the controller 214. In exemplary embodiments, such as some barcode scanning applications, the VF optical element 208 has an aperture from 1 mm to 5 mm. In some embodiments, the image stage 204 is implemented as part of a VF camera assembly.

In embodiments, the VF imaging controller 214 is configured to access one or more scanning parameters 216 stored in the imaging reader 106, stored on the server 112, or stored on another medium. From these scanning parameters 216, the controller 214 determines the number of discrete reference focus imaging planes at which the imaging reader 106 scans for and captures images of the target or an OOI (such as goods 102). The controller 214 further determines the distance of each of those reference focus imaging planes, as measured from the imaging sensor 206. The controller 214, for example, may determine the number and distance of the reference focus imaging planes so that the entire working range 108 is covered by five (5) or fewer imaging planes. In some examples, depending on the scanning parameters 216, the number of central focus imaging planes may be three (3) or fewer.

The imaging controller 214 converts these determined reference focus imaging planes and reference focal distances into parameters or instructions for controlling the actuator 215 for controlling the variable focus optical element 208.

In exemplary embodiments, the variable focus imaging controller 214 has hands-free mode in which the variable focus optical element 208 and the imaging sensor 206 are controlled to capture an image of the target at each of the reference focus imaging planes within the working range in an ordered manner to form a set of captured images of the target, stored in the memory. In some embodiments, that ordered manner is a sequential order, such as from nearest reference focus imaging plane to farthest or vice versa, as measured from the imaging sensor 206.

In some exemplary embodiments, the imaging reader 106 is implemented in a handheld bar code scanner device. When the handheld scanner is placed within a stationary cradle thereby establishing an upright scanning position, the handheld scanner may automatically sense that placement and enter the hands-free mode. In other exemplary embodiments, the imaging reader 106 is implemented as a multi-plane scanner, such as a bioptic scanner.

In exemplary embodiments, the variable focus optical element 208 is discretely controlled to hop to each reference focus imaging plane, avoiding a sweeping operation between imaging planes.

In embodiments, the imaging sensor 112 may be a charge coupled device, or another solid-state imaging device. The imaging sensor 112 may be a one megapixel sensor with pixels of approximately three microns in size. In embodiments, the imaging sensor 112 includes a sensor having an active area of 3 millimeters, 4.5 millimeters, 5 millimeters, 6.8 millimeters, 7.13 millimeters, less than 5 millimeters, less than 10 millimeters, or less than 50 millimeters. The imaging sensor 112 may have a total of about 1 megapixels, 2 megapixels, 2.3 megapixels, 5 megapixels, 5.1 megapixels or more than 5 megapixels. Further, the imaging sensor 112 may include sensors with pixels having dimensions of less than 10 microns, less than 5 microns, less than 3 microns, or less than 2 microns in size in at least one dimension of the pixel. In embodiments, the lens assembly is configured to capture images with a modulation transfer function of 40% at 160 line pairs per millimeter.

Figure 3A:
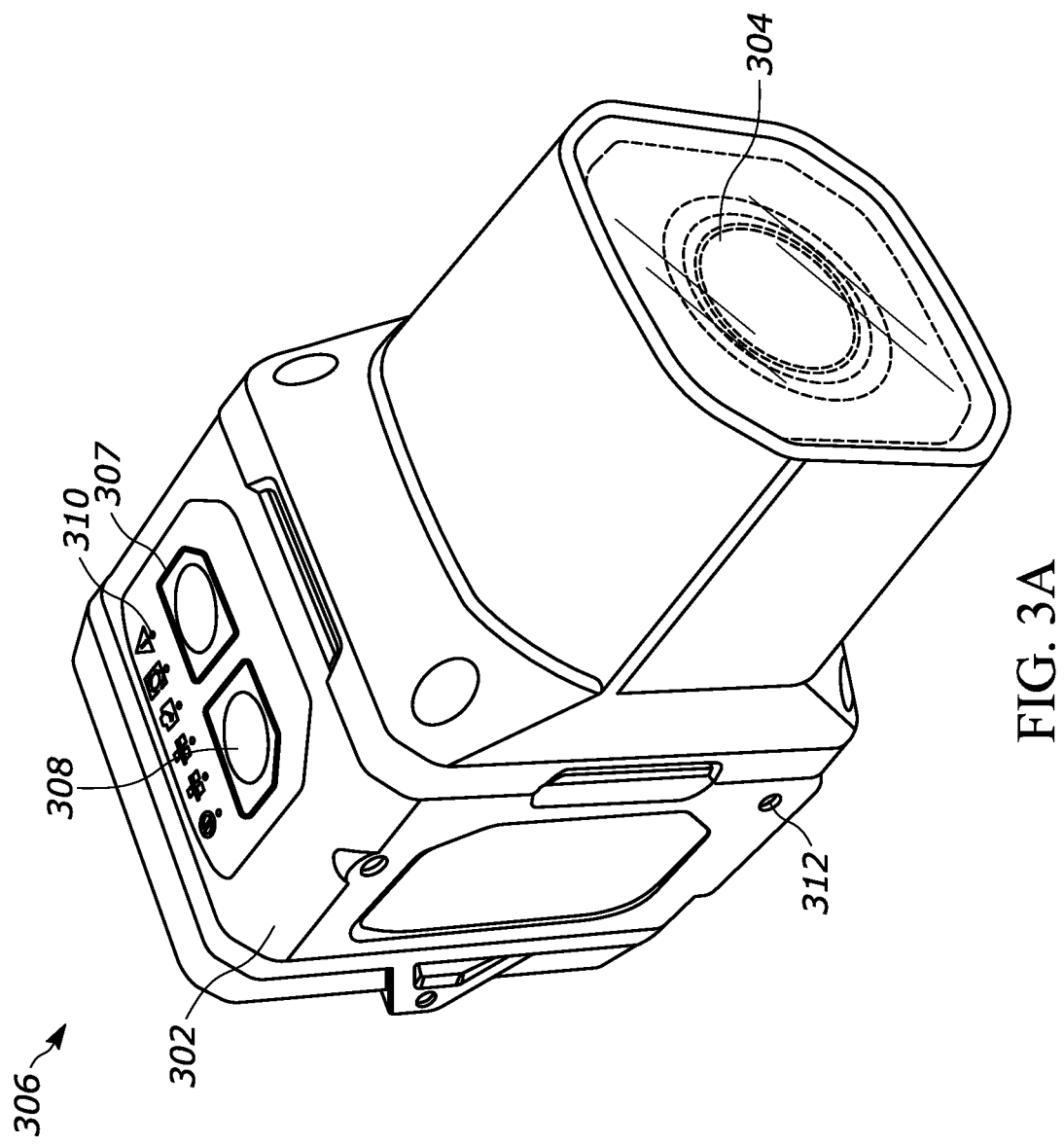
FIG. 3A illustrates a example machine vision device, in accordance with an embodiment of the present invention.

FIG. 3A is a perspective view of an example machine vision device 306 that may be implemented as the imaging reader 106 of FIGS. 1 and 2, in accordance with embodiments described herein. The machine vision device 306 includes a housing 302, an imaging aperture 304, a user interface label 307, a dome switch/button 308, one or more light emitting diodes (LEDs) 310, and mounting point(s) 312. As further described in reference to the method 400 of FIG. 4, the machine vision device 306 may obtain job files (e.g., scanning parameters, calibration parameters, etc.) from a memory (e.g., memory of the imaging reader 106, of the network 112, or of another device) which the machine vision device 306 thereafter interprets and executes. The instructions included in the job file may include device scanning and/or calibration parameters, further discussed in reference to FIG. 4. The scanning and calibration parameters operable to adjust the configuration of the machine vision device 306 prior to capturing images of a target object.

For example, the job file may include instructions to adjust one or more settings related to a focus distance or imaging plane of the machine vision device 306. As an example, assume that at least a portion of the intended analysis corresponding to a machine vision job requires the machine vision device 306 to capture images at different planes or focal distances. To accommodate this requirement, the job file may include scanning and calibration parameters to change the focal distance of the imaging aperture 304 to one or more reference planes, and subsequent imaging planes having focal distance shifts with reference to the one or more reference planes, as described herein. The machine vision device 306 may interpret the instructions (e.g., via one or more processors) and accordingly increase or decrease the focal distance of the imaging aperture 304. Thus, the machine vision device 306 may be configured to automatically adjust its own configuration to optimally conform to a particular machine vision job. Additionally, the machine vision device 306 may include or otherwise be adaptable to include, for example but without limitation, one or more bandpass filters, one or more polarizers, one or more waveplates, one or more DPM diffusers, one or more C-mount lenses, and/or one or more C-mount liquid lenses over or otherwise influencing the focal distance of the machine vision device 306.

The user interface label 307 may include the dome switch/button 308 and one or more LEDs 310, and may thereby enable a variety of interactive and/or indicative features. Generally, the user interface label 307 may enable a user to trigger and/or tune to the machine vision device 306 (e.g., via the dome switch/button 308) and to recognize when one or more functions, errors, and/or other actions have been performed or taken place with respect to the machine vision device 306 (e.g., via the one or more LEDs 310). For example, the trigger function of a dome switch/button (e.g., dome/switch button 308) may enable a user to capture an image using the machine vision device 306 and/or to display a trigger configuration screen of a user application via a monitor or visual display. The trigger configuration screen may allow the user to configure one or more triggers for the machine vision device 306 that may be stored in memory for use in later developed machine vision jobs, as discussed herein.

The mounting point(s) 312 may enable a user connecting and/or removably affixing the machine vision device 306 to a mounting device (e.g., imaging tripod, camera mount, etc.), a structural surface (e.g., a warehouse wall, a warehouse ceiling, scanning bed or table, structural support beam, etc.), other accessory items, and/or any other suitable connecting devices, structures, or surfaces. For example, the machine vision device 306 may be optimally placed on a mounting device in a distribution center, manufacturing plant, warehouse, and/or other facility to image and thereby monitor the quality/consistency of products, packages, and/or other items as they pass through a field of view of the machine vision device 306. Moreover, the mounting point(s) 312 may enable a user to connect the machine vision device 306 to a myriad of accessory items including, but without limitation, one or more external illumination devices, one or more mounting devices/brackets, and the like.

In addition, the machine vision device 306 may include several hardware components contained within the housing 302 that enable connectivity to a computer network (e.g., network 112 of FIG. 2). For example, the machine vision device 306 may include a networking interface that enables the machine vision device 306 to connect to the network (i.e., the network 112 of FIG. 2), such as a Gigabit Ethernet connection and/or a Dual Gigabit Ethernet connection. Further, the machine vision device 306 may include transceivers and/or other communication components as part of the networking interface to communicate with other devices via, for example, Ethernet/IP, PROFINET, Modbus TCP, CC-Link, USB 3.0, RS-232, and/or any other suitable communication protocol or combinations thereof.

Figure 3B:
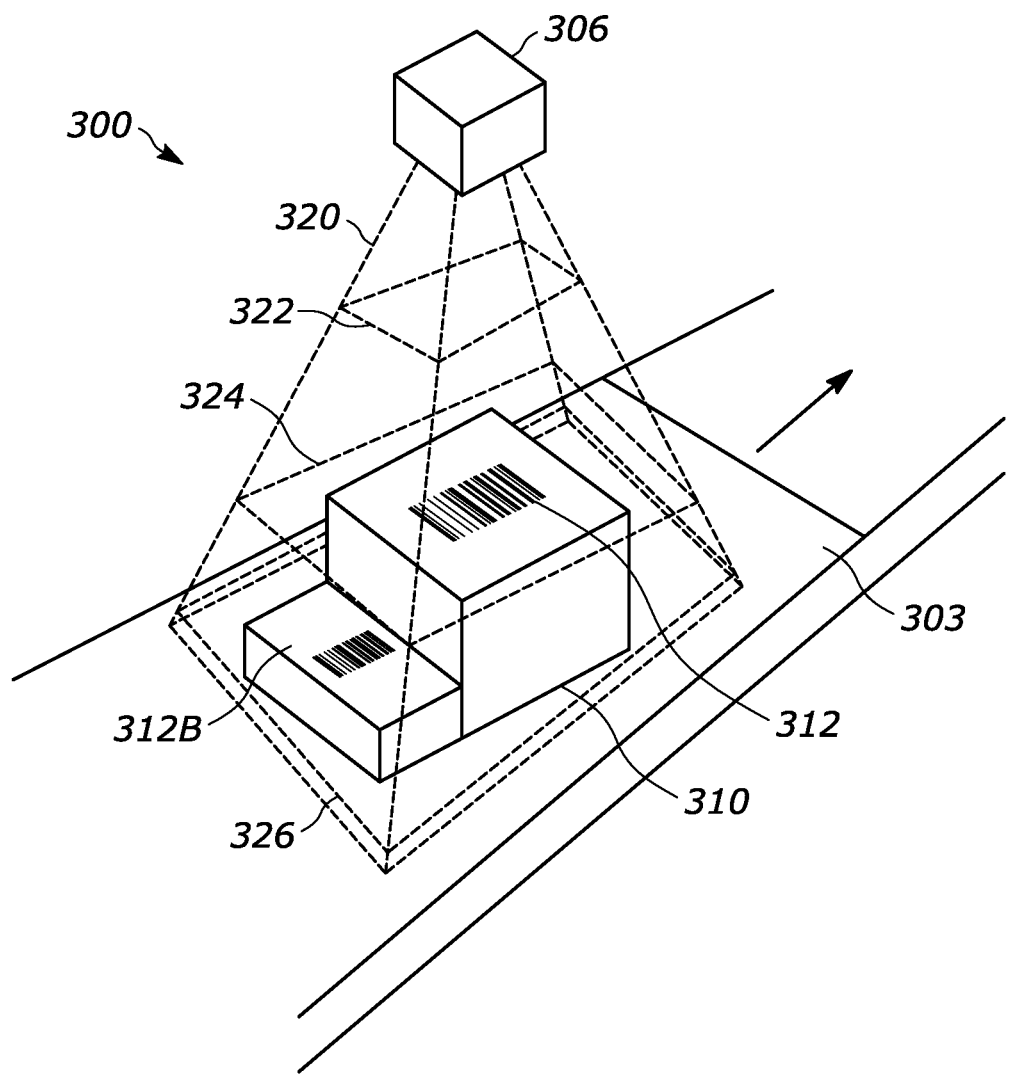
FIG. 3B illustrates an example environment for performing machine vision scanning of an object, in accordance with an embodiment of the present invention.

FIG. 3B illustrates an example environment 300 for performing machine vision scanning of an object as described herein. In the environment 300 of FIG. 3B the machine vision device 306, implemented as the imaging reader 106 of FIGS. 1 and 2, is position above a scanning surface 303. The machine vision device 306 is disposed and oriented such that a field of view (FOV) 320 of the machine vision device 306 includes a portion of the scanning surface 303. The scanning surface 303 may be a table, podium, mount for mounting an object or part, a conveyer, a cubby hole, or another mount or surface that may support a part or object to be scanned. As illustrated, the scanning surface 303 is a conveyer belt having an object of interest 310 thereon. The object of interested 310 is illustrated as being within the FOV 320 of the machine vision device 306. The object of interest 310 contains indicia 312A and 3126 thereon. The machine vision device 306 captures one or more images of the object of interest 310 and may determine a region of interest within the image that contains the object of interest 310, or the ROI may be determined as a region of the image that contains the indicia 312A and 312B. As illustrated, the indicia 312A 312B are barcodes, but the indicia 312A and 312B may individually include one or more of 1D barcode, 2D barcode, QR code, static barcode, dynamic barcode, alphabetical character, text, numerals, alphanumeric, other characters, a picture, vehicle identification number, expiration date, tire identification number, or another indicia having characters and/or numerals. In examples, the object of interest 310 may have more than one indicia, and the machine vision device 306 may capture an image of the FOV 320 and determine multiple ROIs in the captured image, each ROI having at least one indicia for decoding.

The machine vision device 306 is illustrated as having a first imaging plane 322, a second imaging plane 324, and a third imaging plane 326 all in the working range of the machine vision device 306. The machine vision device 306 may obtain a plurality of images at different focuses for identifying the barcodes 312A and 312B. For example, the machine vision device 306 may obtain a first image with a focal plane at or near the second imaging plane 322 for identifying the barcode 312A, and the machine vision device 306 may change its focus to obtain an image at the third focal plane 326 for identification of the barcode 312B. As such, the machine vision device 306 may be able to identify a plurality of indicia during a single scanning session by obtaining images at one or more focal planes. Further, the focal planes may be predetermined and stored in a memory for performing machine vision applications as described herein. For example, the second imaging plane 324 may be a reference plane, as further described in reference to FIG. 4, with the third focal plane 326 being imaged after performing a focal diopter shift from the focus at the second focal plane 322.

The machine vision device 306 may be mounted above the object of interest 310 on a ceiling, a beam, a metal tripod, or another object for supporting the position of the machine vision device 306 for capturing images of the scanning bed 303. Further, the machine vision device 306 may alternatively be mounted on a wall or another mount that faces objects on the scanning bed 303 from a horizontal direction. In examples, the machine vision device 306 may be mounted on any apparatus or surface for imaging and scanning objects of interest that are in, or pass through, the FOV 320 of the machine vision device 306.

The described method and system may be implemented for identifying text, numerals, or characters in any orientation, and any arrangement.

Figure 4:
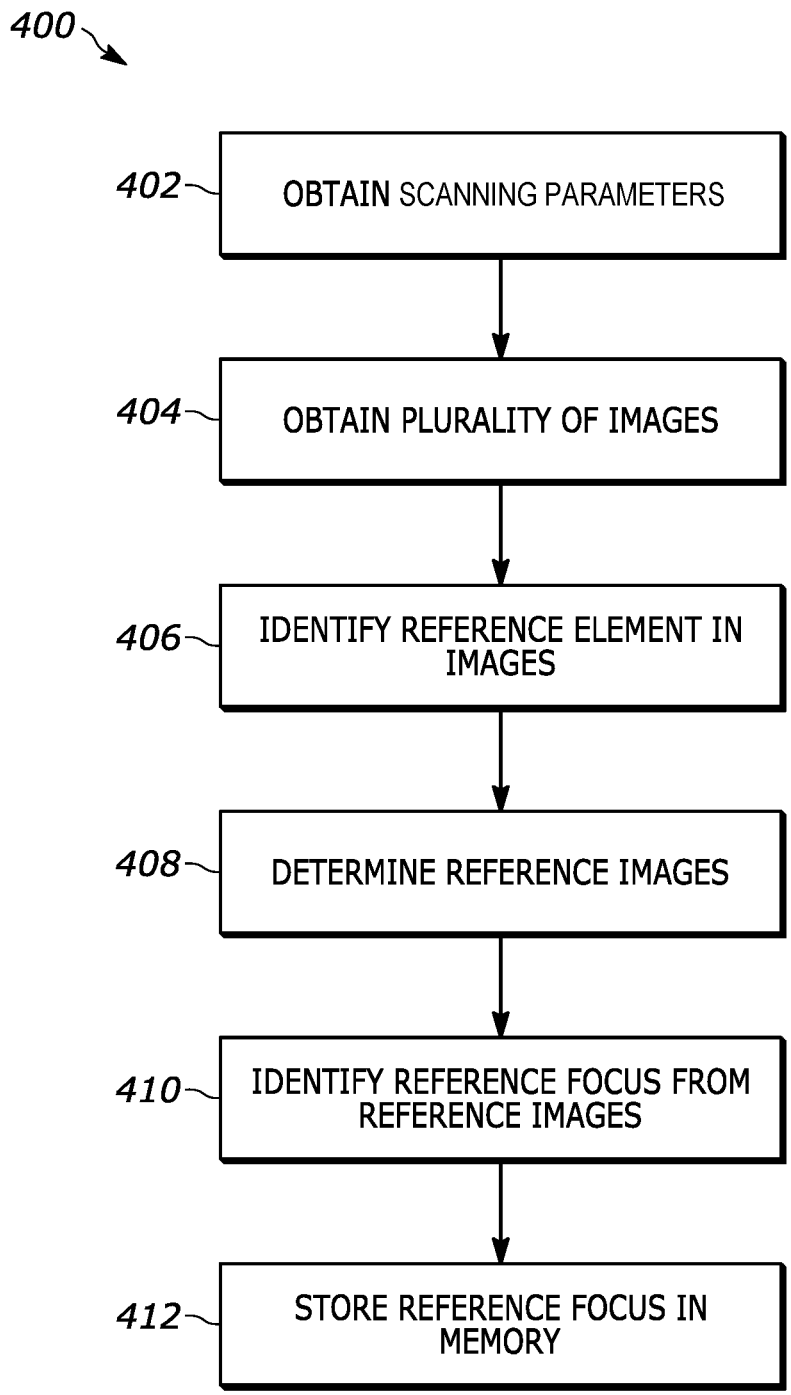
FIG. 4 is a flowchart representative of a method for performing focus calibration of an imaging system.

FIG. 4 illustrates a method 400 of performing focus tuning for an imaging reader. The method 400 may be implemented by the imaging readers 106 and 302 of any of FIGS. 1-3, for example. In the example of a handheld scanner, initially, the imaging reader enters a hands-free mode indicating that swipe scanning is to be performed. In some examples, the handheld scanner includes a trigger on or near a handle, and the trigger, when depressed, enters the scanner into the hands-free mode for swipe scanning. In some embodiments, the imaging scanner is part of a scanning station of an inventory system, where goods are conveyed by the scanning surface or across the scanning surface to monitor and control delivery of the goods, for example, shipping goods from a facility or receiving shipped goods to a facility, as illustrated in FIG. 1. Therefore, the imaging scanner of FIG. 1 may operate mainly in the hands-free mode, and a manual mode may be activated for manual scanning and/or calibration purposes. Further, the methods described herein may be implemented with the scanner of FIG. 1 being an inspection station where on OOI moves into a field of view of the scanner, the OOI pauses momentarily in the field of view to be imaged, and then the OOI moves out of the field of view.

For simplicity, the method 400 will be described in reference to components of FIGS. 1 and 2, but it should be understood that the method 400 may be performed for any imaging system for scanning a target or object of interest. The imaging reader 106 obtains scanning parameters at block 402. In exemplary embodiments, the scanning parameters include frame rate of the image sensor of the imaging reader, exposure time of that image sensor, the aperture or aperture range of the variable focus optical element, the swipe speed of movement of the target, an automatic movement speed of a conveyer belt or other speed of a means for automatic swiping, a size of the working distance, a nearest distance of the working distance, a farthest distance of the working distance, and/or focusing time of the variable focus optical element. Such parameters may be stored within the imaging reader 106, for example, in memory of the imaging reader, and/or one or more of the scanning parameters may be stored in another system such as at the server 200. Further, one or more of the scanning parameters may be stored in individual elements of the imaging reader 106 such as in the variable focus optical element 208, variable focus imaging controller 214, and/or other elements of the imaging reader 106.

In some embodiments, the scanning parameters are target specific parameters, such as the types and/or sizes of the targets to be scanned. A target may include one or more goods 102 or a reference target for performing calibration and setup of the imaging reader 106. In some embodiments, the scanning parameters include the types of reference indicia on a target, such as whether the targets contain 1D or 2D barcodes, static QR codes, dynamic QR codes, UPC codes, alphanumeric codes, a predefined custom pattern or indicia, or other identifying indicia. The reference indicia may be an element or feature having a spatial frequency content of greater than a 2 mil barcode or 2 pixels per. The reference indicia may be an element or feature with a plurality of different physical feature sizes at different focuses of the imaging reader 106, which may be useful for determining a plurality of reference focuses, each reference focus determined from a differently sized physical feature.

In some embodiments, obtaining the scanning parameters may include obtaining calibration parameters. The calibration parameters may include one or more reference focus parameters, or scanning parameters for determining reference focus planes. In some examples, some scanning parameters and calibration parameters are obtained from the imaging reader communicating with a server, such as the server 112, which may include an inventory control manager that access information on targets and OOIs.

The variable focus imaging controller 214, at 404, controls the imaging sensor 206 to obtain a plurality of images of a target OOI having a reference element. The variable focus imaging controller 214 may assess the obtained scanning parameters and control the image sensor, variable focus optical element, and other components of the imaging reader 106 according to the scanning parameters to obtain the plurality of images. The focus imaging controller 214 controls the variable focus optical element to change a focus of the variable focus optical element such that each image of the plurality of images is obtained at a different focus of the imaging reader 106. The focus imaging controller 214 may control the variable focus optical element to obtain images at focuses over the entire scanning range of the imaging reader 106, over a subset of focus distances of the scanning range, over multiple subsets of focus distances of the scanning range, or over a plurality of distinct and discrete focus distances of the imaging reader 106. The focus or focal plane of each image is stored in a memory or otherwise associated with each image for further processing.

The OOI may be a predesigned reference target specifically designed for performing calibration or setup of the imaging reader 106, or the OOI may be goods having indicia thereon that may be used for performing calibration and setup. A predesigned reference target may include one or more barcodes of different sizes and/or at different distances from the imaging reader 106. The predesigned reference target may have any indicia, physical features, or images thereon as one or more reference elements for performing the calibration as described herein.

The processor of the imaging reader 106, at 406, identifies one or more of the reference elements in images of the plurality of images. For example, the processor may identify a barcode in one of the images of the plurality of images, or the processor may identify the barcode in multiple images of the plurality of images. For example, the processor may identify a same barcode in three images of the plurality of images, with the three images obtained at three different focuses of the imaging reader 106. The three images may be taken at a first, second, and third focal plane, with the first focal plane being closest to the imaging reader 106, the second focal plane at a further distance, and the third focal plane being at the furthest distance of the focal planes. The processor may identify a reference element in more or less than 3 images of the plurality of images. Three images obtained at different focal distances is used herein for simplicity and clarity. The images identified as having the reference element may be determined to be candidate reference images for further processing.

At 408, the processor of the imaging reader 106 analyzes the image and determines a reference image from the one or more candidate reference images. To determine the reference image, the processor may analyze the candidate reference images of the reference element by performing image processing on the images. The image processing may include applying a spatial lowpass filter, spatial high pass filter, Fourier lowpass or high pass filter, performing a noise reduction, a scaling, rotation, shearing, reflection, or another image filtering or image processing technique. Additionally, analyzing the image may include determining a property or characteristic of the images such as a sharpness value, a contrast value, an image resolution, a spatial frequency content value, a noise measurement value, a dynamic range value, a measurement of image distortion, a blur value, a pixels per module value, a modulation transfer function, or another value associated with an image or image quality. The processor may determine the reference image from the candidate reference images based on one or more of the image properties or characteristics. For example, the second image of the three identified candidate reference images may be determined to have a higher sharpness value than the other two candidate reference images. The processor may then identify the second image as the reference image from the candidate reference images. In examples, the processor may use a combination or weight combination of image properties and/or characteristics for identifying the reference image. In the current example, a single reference element is used for clarity and simplicity, in implementations, an OOI or target may have more than one reference element, and above described processes may be used to determine a reference image for each reference element.

The processor of the imaging reader 106, at 410, identifies a reference focus of the tunable optical element as the focus of the imaging system 106 when the identified reference image was obtained. In the current example with three images identified as having the reference element, and the second image as the reference image, the processor determines the reference focus to be the focus stored in memory and associated with the second image.

The method 400 further includes, at 412, the processor storing the identified reference focus in a memory. The processor may store the reference focus in the memory of the imaging reader 106, or a memory of the server 112, or another system or device.

Typically, autofocus and VF optical elements may have focus drift over time and as environment factors change, but in practice, relative diopter shifts are often accurate. Therefore, once the reference focus is determined using the method 400 of FIG. 4, predetermined reference focuses may be used for performing machine vision and scanning applications. For example, an OOI may be a printed circuit board (PCB) having multiple indicia on a plurality of positions and focal distances from the imaging reader. A reference focus may be determined using the method 400 of FIG. 4 to image one indicia on the PCB, and the variable focus imaging controller 214 may alter the focus of the variable focus optical element 208 according to predetermined, or known, relative focus shifts to image other indicia on the PCB and components thereon. The relative focus shifts may be stored in the memory of the imaging reader 106, on the memory of the server 112, or on another system or device. In such implementations, the calibration and setup of the imaging reader 106 only requires method 400 to be performed a single time to determine the reference focus, and known relative focus shifts are then used for imaging other features and indicia an OOI.

In another example, an OOI may be a manufactured part having a plurality of gears. The methods described herein may be used in performing inspection of teeth and other physical features of the gears. A reference focus may be determined for one gear using the method 400 of FIG. 4, and predetermine or known focus shifts may be used for obtaining a plurality of images with each image focused on a different imaging plane for inspection of another gear of the manufactured part. The set of images, with each image focused on a different gear, may then be visually or digitally inspected to streamline device inspections which reduces the time for performing part inspections. The described calibration and setup procedures may assist in performing PCBs, mechanical parts, small or hard to see physical features (e.g., holes, pins etc.) or any part requiring imaging in three dimensions for analysis. Current part inspection systems may use two, three, or more imaging readers positioned at different angles and relative positions to inspect a single OOI. The described methods allow for calibration and operation of a single imaging reader for performing three dimensional analysis of OOIs.

In implementations, the relative focus shift values, in addition to the reference focus, may also be determined using the method 400 of FIG. 4, with the relative values being focus changes or diopter changes relative to the reference focus. For example, a user may place a series of barcodes in the field of view of the imaging reader 106, and the method 400 may be performed to identify a reference focus at an imaging plane having one barcode, and then determine the relative focus shifts at imaging planes having the other barcodes. The reference focus and relative focus shifts may then be stored in memory. The method 400 may then be performed again to determine a new reference focus if the focus of the imaging system 106 shifts. The stored relative focus shifts may then be used to image different planes relative to the imaging plane of the reference focus. As such, only a single reference focus must be re-calibrated by having the relative focus shifts being predetermined and stored. The described methods provide a fast, reliable, robust, solution for performing imaging system calibration and recalibration for performing machine vision and scanning applications in three dimensions over a plurality of imaging planes.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Alternative implementations of the examples represented by the block diagram of the system 200 of FIG. 2 includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An automatic focus tuning imaging system comprising:
   a tunable optical element;
   a controller in communication with the tunable optical element, the controller configured to control a focus of the tunable optical element;
   a reference element at a reference plane a distance from the imaging system;
   a processor and computer-readable media storage having (i) one or more predefined diopter values and (ii) machine readable instructions stored thereon that, when the machine readable instructions are executed, cause the imaging system to:
      obtain, by an imaging sensor of the imaging system, a plurality of images, each image of the plurality of images obtained at a different predetermined focus of the tunable optical element, the plurality of images being a sequential plurality of images, each of the different predetermined focus of the tunable optical element being predetermined prior to obtaining a first of the plurality of images;
      identify, by the processor, the reference element in at least one of the images of the plurality of images, wherein each image of the plurality of images are obtained before performing any identification by the processor of the reference element in at least one of the images of the plurality of images;
      determine, by the processor, a reference image of the plurality of images from the at least one of the images including the reference element;
      identify, by the processor, a reference focus of the tunable optical element, the reference focus corresponding to the determined reference image; and
      store, in the memory, the identified reference focus.

2. The system of claim 1, wherein the reference element comprises at least one of a 1D barcode, 2D barcode, static QR code, dynamic QR code, UPC code, a predefined custom pattern, alphanumeric identifier, a feature having a spatial frequency content of greater than of greater than a 2 mil barcode or 2 pixels per module, or an element with a plurality of different sized features at different focuses of the imaging system.

3. The system of claim 1, wherein the reference element comprises at least one of text, electrical traces on a circuit board, one or more electrical components, grids on a surface, a pattern on a surface, predefined fiducial marks, or an outline of an object of interest.

4. The system of claim 1, wherein the reference element in disposed on an object of interest and the reference element comprises a reflective feature having a reflectivity greater than other features of the object of interest.

5. The system of claim 1, wherein the reference element is selectively removable from the imaging system.

6. The system of claim 1, wherein to determine the reference image the machine readable instructions further cause the imaging system to:
    determine, by the processor, an image quality value for each image identified as having the reference element; and
    determine, by the processor, the reference image based on the determined image quality values.

7. The system of claim 6, wherein the image quality value comprises at least one of a sharpness value, contrast value, a normalized sharpness value, a resolution, a modulation transfer function, and a spatial frequency content value.

8. The system of claim 1, wherein the reference element comprises a plurality of reference targets, wherein each reference target of the plurality of reference targets is disposed at a different distance from the imaging system.

9. The system of claim 1, wherein tunable optical element comprises a liquid lens.

10. The system of claim 1, wherein the tunable optical element comprises an electrically tunable lens.

11. The system of claim 1, further comprising a plurality of imaging sensors; and
    wherein to obtain the plurality of images, the machine readable instructions cause the imaging system to obtain, by more than one imaging sensor of the plurality of imaging sensors, the plurality of images.

12. The system of claim 1, wherein the reference element comprises a plurality of reference elements at a plurality of reference planes; and
    wherein the machine readable instructions further cause the imaging system to:
    identify, by the processor, the each reference element of the plurality of reference elements in at least one of the images of the plurality of images;
    determine, by the processor, an image quality value for each image identified as having a reference element;
    determine, by the processor, a plurality of reference images based on the determined image quality values;
    identify, by the processor and based on the determined plurality of reference images, a plurality of reference focuses of the tunable optical element; and
    store, in the memory, the identified plurality of reference focuses.

13. The system of claim 1, wherein the machine readable instructions further cause the imaging system to:
    focus, by the controller, the tunable optical element to focus the imaging system to an inspection imaging plane, the inspection imaging plane (i) having an object of interest for inspection and (ii) being determined from the identified reference focus.

14. A method for performing focus tuning of an imaging system, the method comprising:
    obtaining, by an imaging sensor, a plurality of images, each image of the plurality of images obtained at a different predetermined focus of a tunable optical element, the plurality of images being a sequential plurality of images, each of the different predetermined focus of the tunable optical element being predetermined prior to obtaining a first of the plurality of images;
    identifying, by a processor, a reference element in at least one of the images of the plurality of images, wherein each image of the plurality of images are obtained before performing any identification by the processor of the reference element in at least one of the images of the plurality of images;
    determining, by the processor, a reference image of the plurality of images from the at least one of the images including the reference element;
    identifying, by the processor, a reference focus of the tunable optical element, the reference focus corresponding to the determined reference image; and
    storing, in a memory, the identified reference focus.

15. The method of claim 14, wherein the reference element comprises at least one of text, electrical traces on a circuit board, one or more electrical components, grids on a surface, a pattern on a surface, predefined fiducial marks, or an outline of an object of interest.

16. The method of claim 14, wherein the reference element in disposed on an object of interest and the reference element comprises a reflective feature having a reflectivity greater than other features of the object of interest.

17. The method of claim 14, wherein determining the reference image comprises:
    determining, by the processor, an image quality value for each image identified as having the reference element; and
    determining, by the processor, the reference image based on the determined image quality values.

18. The method of claim 17, wherein the image quality value comprises at least one of a sharpness value, contrast value, a normalized sharpness value, a resolution, a modulation transfer function, and a spatial frequency content value.

19. The method of claim 14, wherein the tunable optical element comprises a liquid lens.

20. The method of claim 14, wherein the reference element comprises a plurality of reference elements, and wherein the method further comprises:
    identifying, by the processor, each reference element of the plurality of reference elements in at least one of the images of the plurality of images;
    determining, by the processor, an image quality value for each image identified as having a reference element;
    determining, by the processor, a plurality of reference images based on the determined image quality values;
    identifying, by the processor and based on the determined plurality of reference images, a plurality of reference focuses of the tunable optical element; and
    storing, in the memory, the identified plurality of reference focuses.

* * * * *